B. M. W. HANSON.
METAL WORKING MACHINE.
APPLICATION FILED NOV. 1, 1918.
1,346,822.
Patented July 20, 1920.
11 SHEETS—SHEET 2.
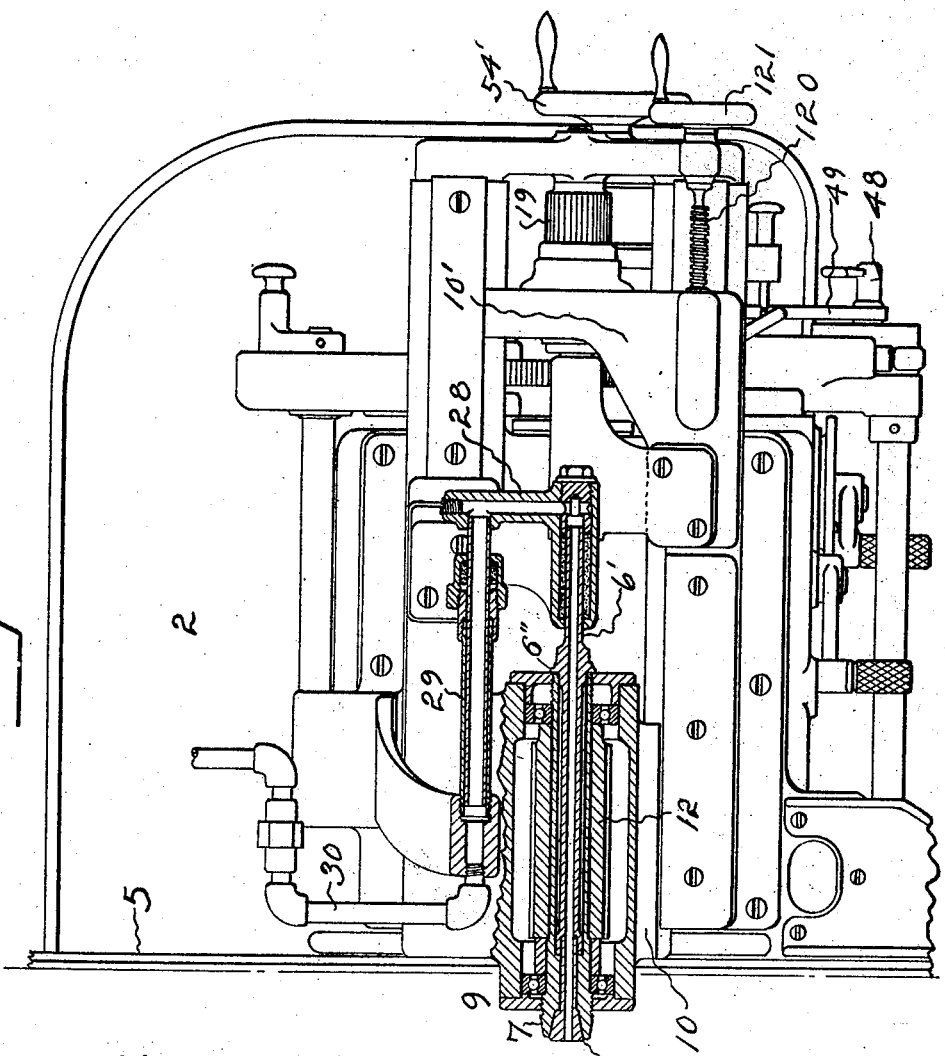
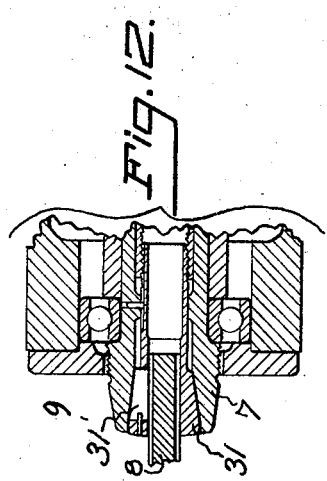
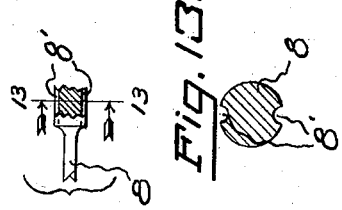
Inventor
B. M. W. Hanson
By Hurt Lithulow
Attorney

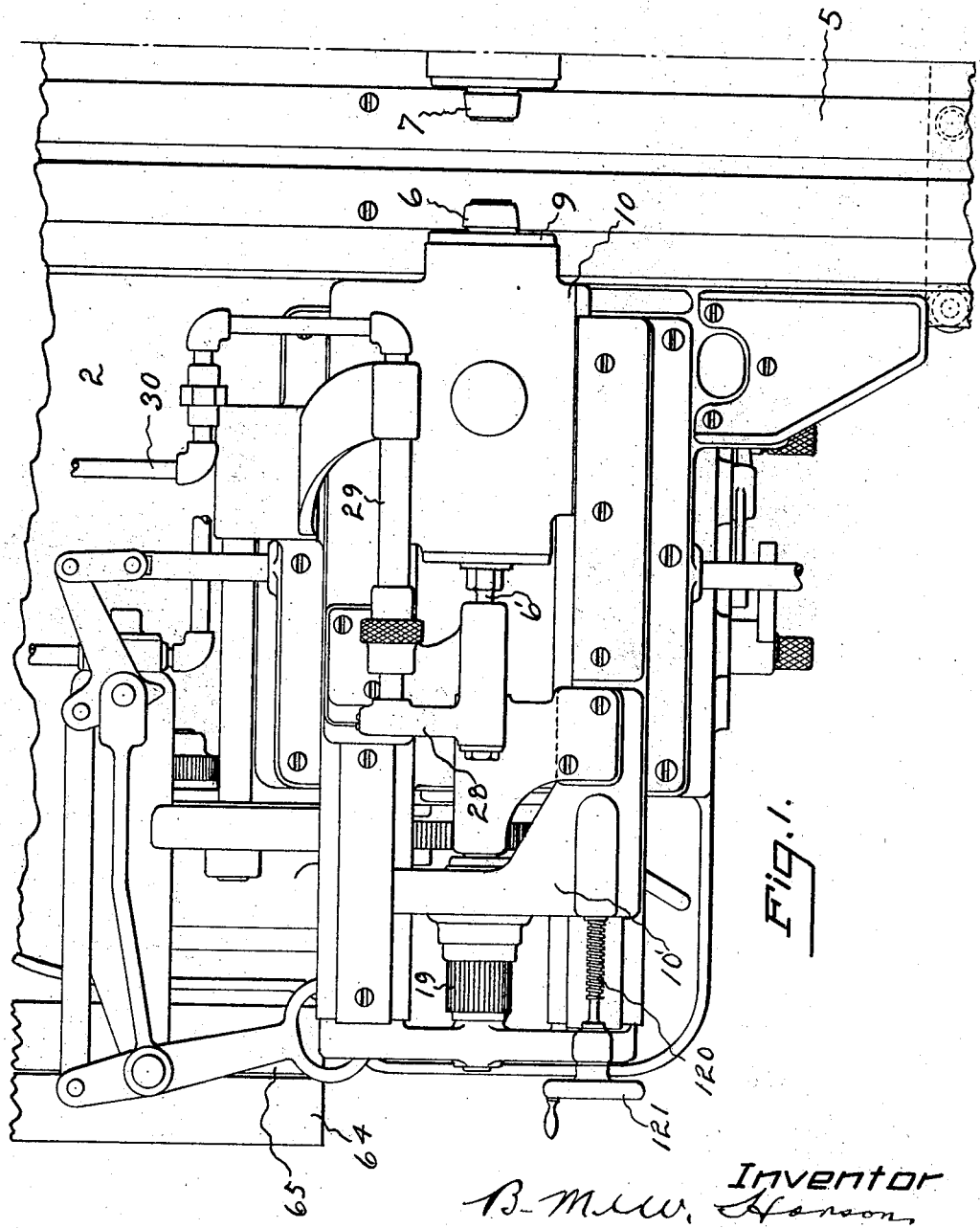

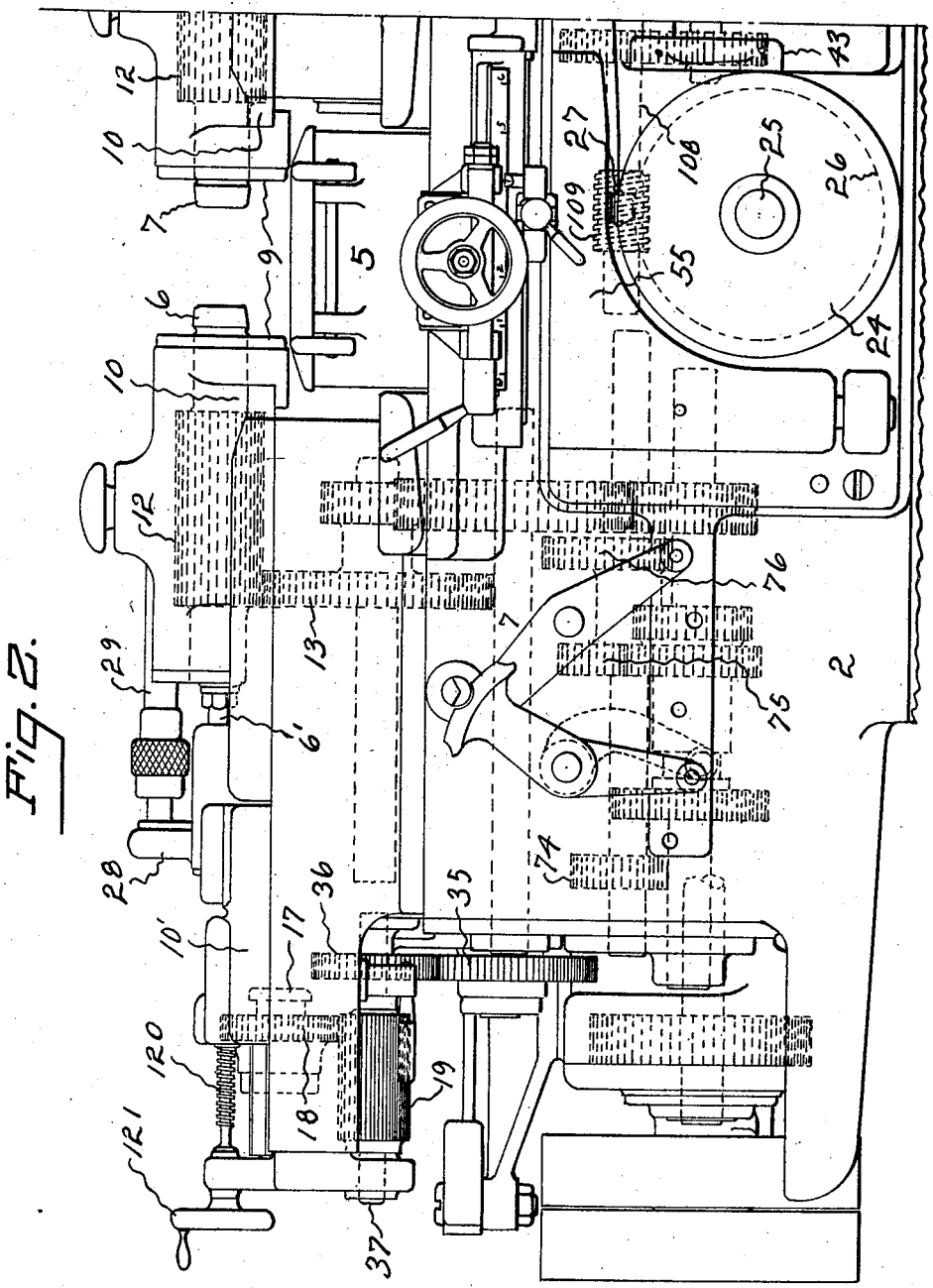

B. M. W. HANSON.
METAL WORKING MACHINE.
APPLICATION FILED NOV. 1, 1918.
1,346,822.
Patented July 20, 1920.
11 SHEETS—SHEET 4.
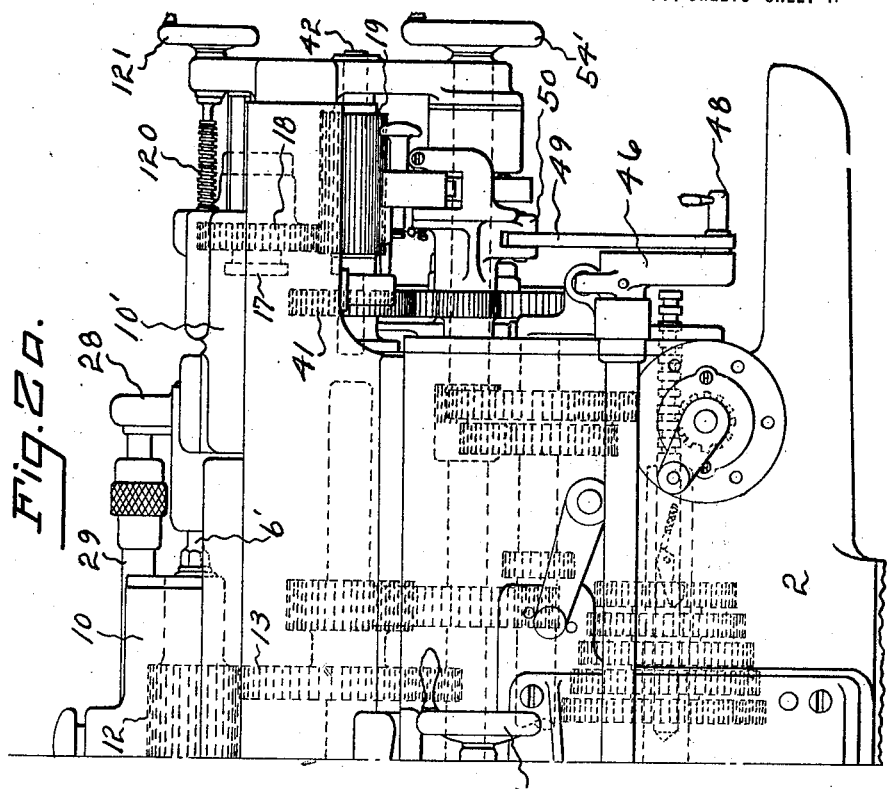

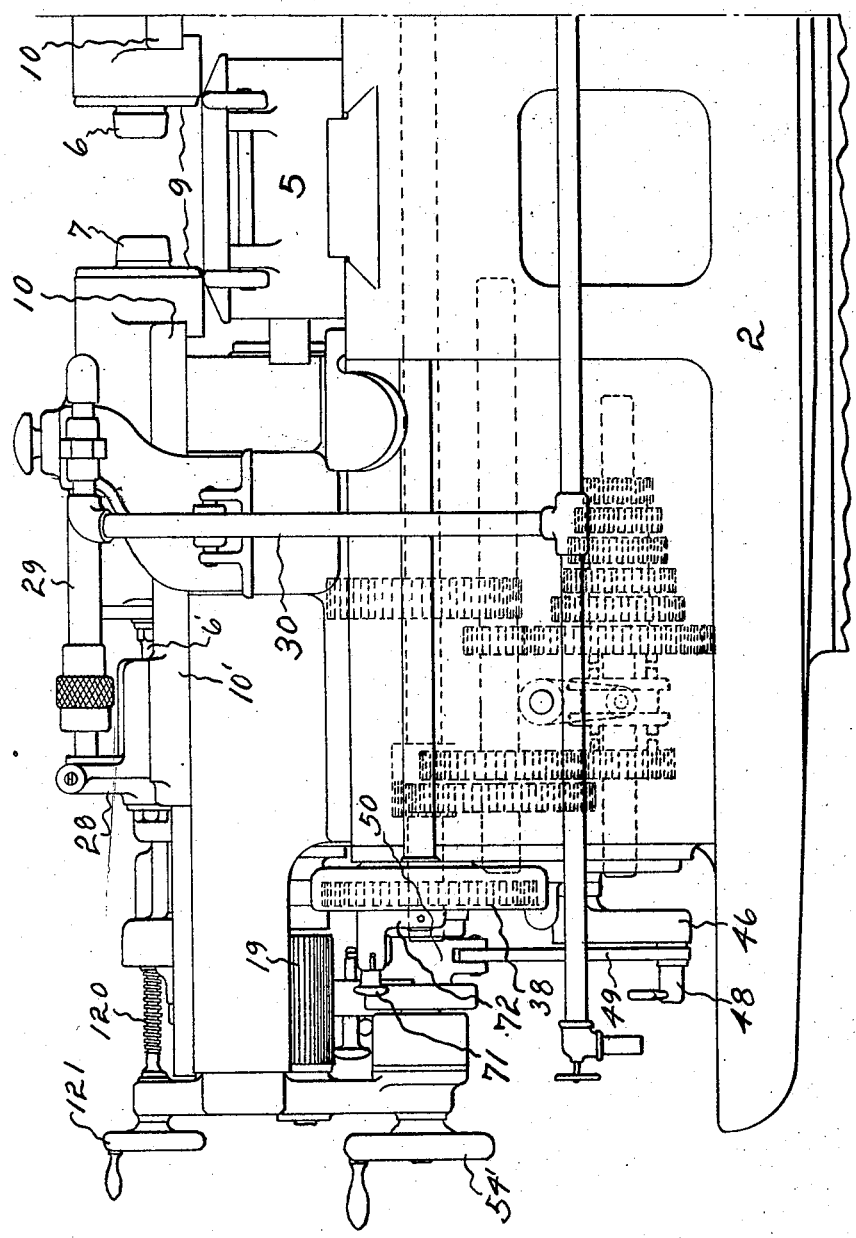

B. M. W. HANSON.
METAL WORKING MACHINE.
APPLICATION FILED NOV. 1, 1918.
1,346,822.
Patented July 20, 1920.
11 SHEETS—SHEET 6.
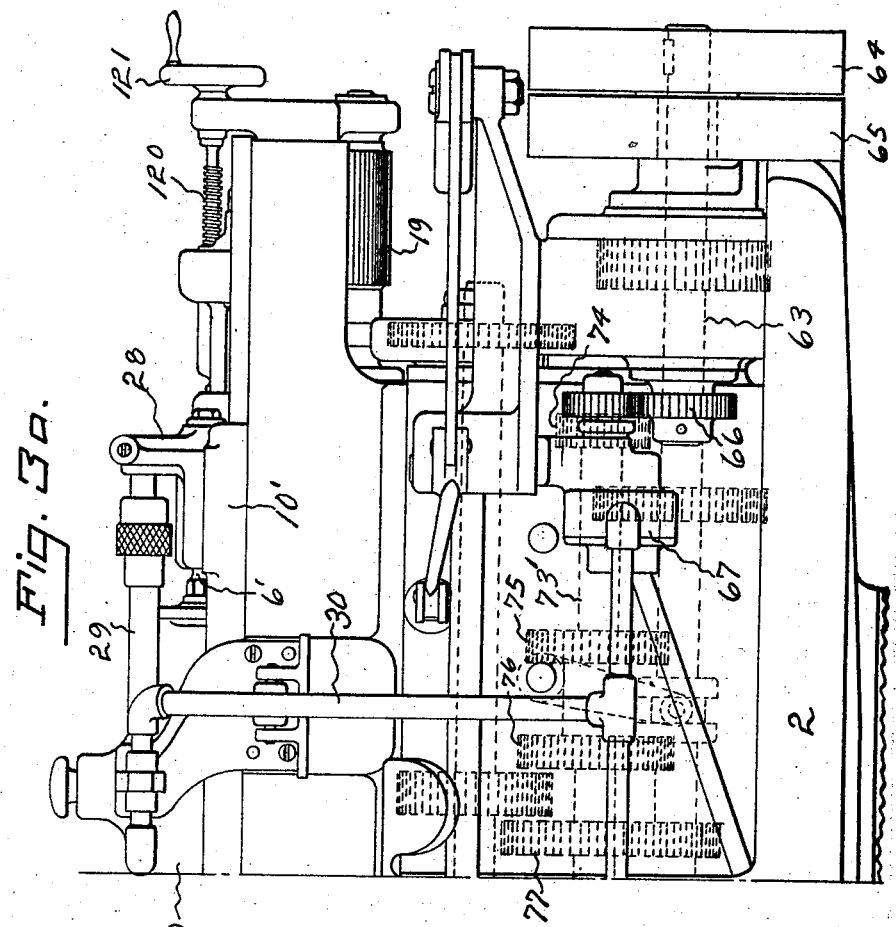
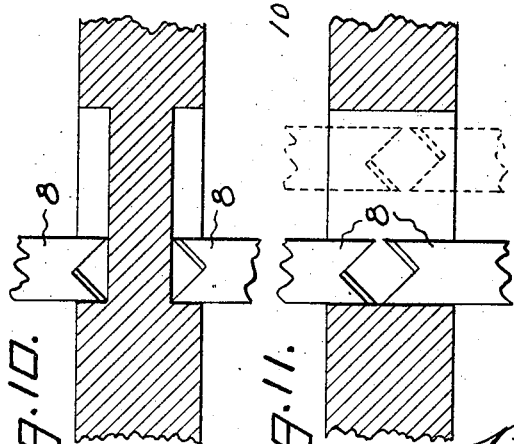
Inventor
B. M. W. Hanson
By Hurt Sutherland
Attorney B. M. W. HANSON.
METAL WORKING MACHINE.
APPLICATION FILED NOV. 1, 1918.
1,346,822.
Patented July 20, 1920.
11 SHEETS—SHEET 7.
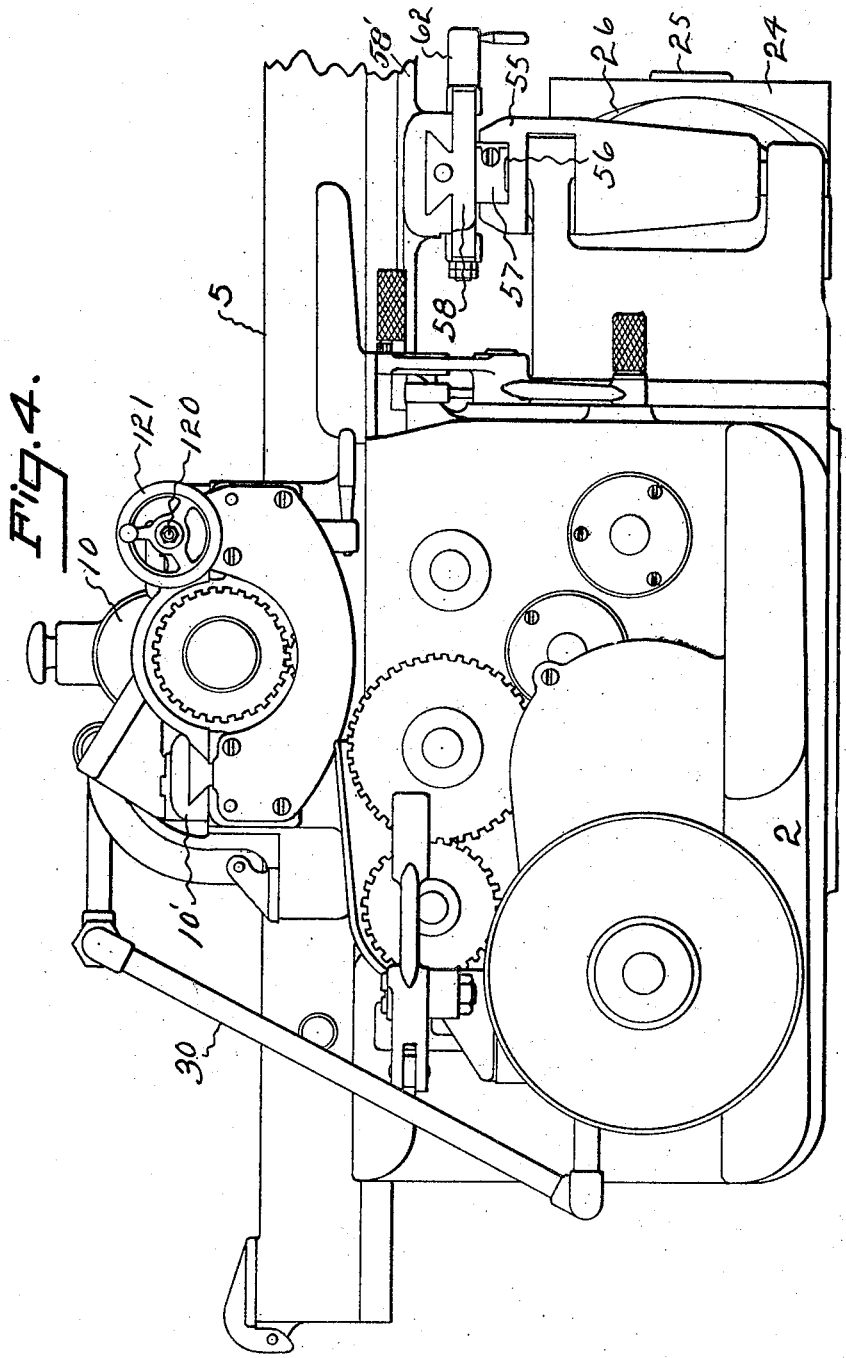
Inventor
B. M. W. Hanson,
By Hut Sutherland
Attorney

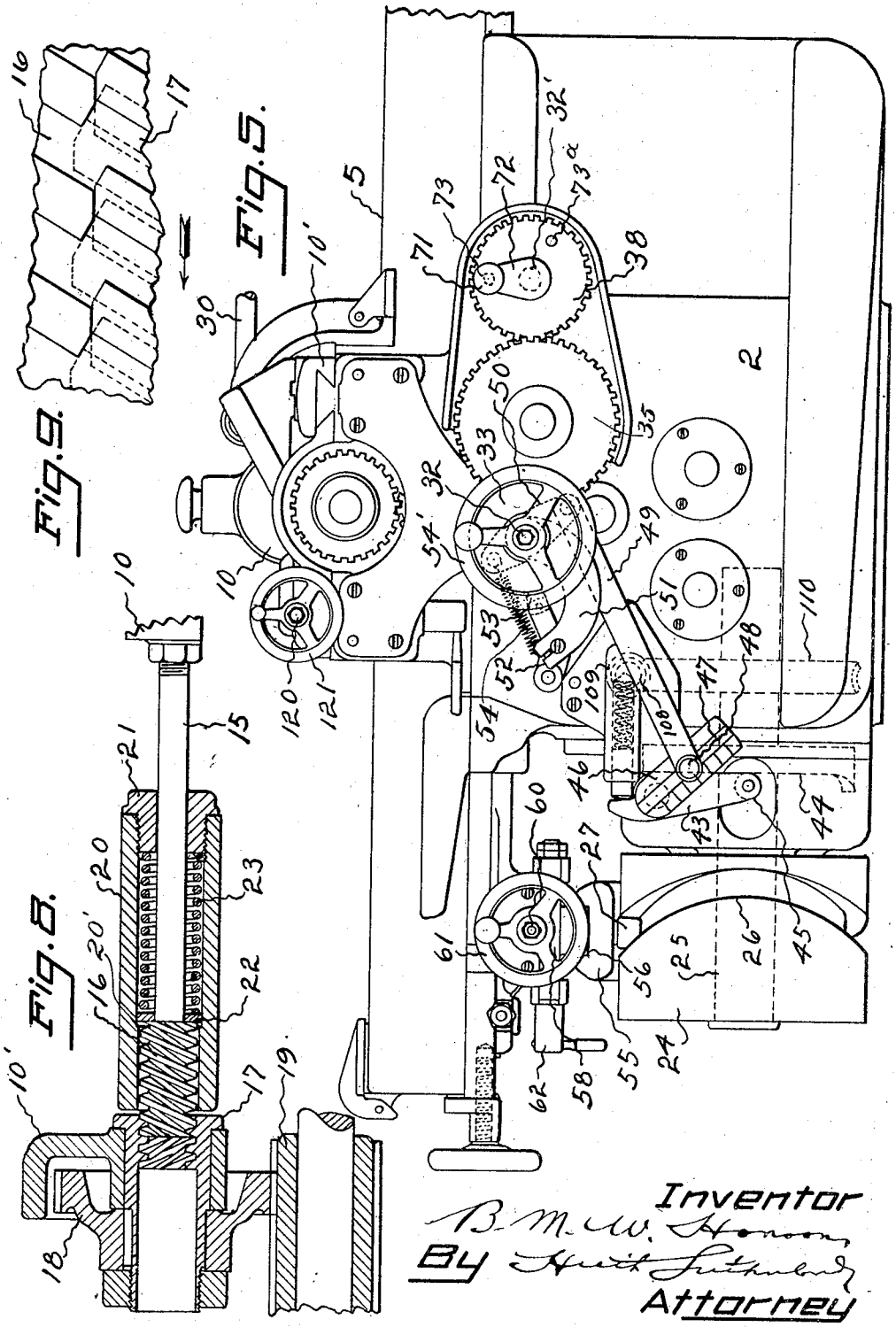

B. M. W. HANSON.
METAL WORKING MACHINE.
APPLICATION FILED NOV. 1, 1918.

1,346,822.

Patented July 20, 1920.
11 SHEETS—SHEET 10.

Inventor
B. M. W. Hanson
By Hunt Suther
Attorney

B. M. W. HANSON.
METAL WORKING MACHINE.
APPLICATION FILED NOV. 1, 1918.

1,346,822.

Patented July 20, 1920.
11 SHEETS—SHEET 11.

INVENTOR.
B. M. W. Hanson
BY
ATTORNEY.

UNITED STATES PATENT OFFICE.

BENGT M. W. HANSON, OF HARTFORD, CONNECTICUT.

METAL-WORKING MACHINE.

1,346,822.

Specification of Letters Patent.   Patented July 20, 1920.

Application filed November 1, 1918. Serial No. 260,730.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal-working machines. As will be understood the machine may be employed with advantage in a variety of different ways in this particular art. As a matter of fact some of the features of the invention can be with advantage incorporated in machines of other kinds.

Among the many advantages of the invention is the provision of a machine of the general character set forth, which is simple in construction, positive and efficient in action and by which rapidity of results are attained.

In the drawings accompanying and forming part of the present specification I have shown rather in detail and quite fully, one of the several forms of embodiment of the invention, which, to enable those skilled in the metal-working machine and allied arts to practice the invention, will be set forth fully in the following description. The novelty of the invention will be included in the claims succeeding said description. The showing made by said drawings and associated description as will be inferred, is merely one of the several ways of carrying the invention into effect. It is conceivable that some of the features may be omitted. As a matter of fact, instead of employing a plurality of spindles there may be instances where I employ but one. In like fashion while I prefer to utilize a traveling carrier as a suitable support for example for the work, it may not always be necessary to employ this for such purpose nor is it necessary that it be movable. So also some of the elements may be reversed.

Referring to said drawings:

Figures 1 and 1ª are collectively a top plan sectional view of a machine involving the invention, portions being removed in the upper and lower parts of Fig. 1 and the lower part of Fig. 1ª, said Fig. 1 showing also a part of the spindle appearing in Fig. 1ª.

Figs. 2 and 2ª represent collectively a front elevation of the machine.

Figs. 3 and 3ª represent collectively a rear elevation of said machine.

Fig. 4 is a left hand elevation of the same the right side view being broken away.

Fig. 5 is an elevation of the machine as seen from the right, a portion at the right being broken away.

Fig. 8 is a sectional view of part of one of the spindle-advancing means.

Fig. 9 is a detail view of a threaded surface of a feed-nut.

Fig. 10 is a sectional plan view of a piece of work and tools arranged to groove.

Fig. 11 is a practically similar view, the tools being arranged for slotting and the dotted lines showing the tools in the positions they occupy when the slot is completed.

Fig. 12 is a sectional view of the chucking end of one of the spindles with the tool therein.

Fig. 13 is a cross section on the line 13—13 of Fig. 12.

Fig. 14 is a diagram showing spindle feed transmission.

Like characters refer to like parts throughout the several views which are on different scales.

Figure 6:
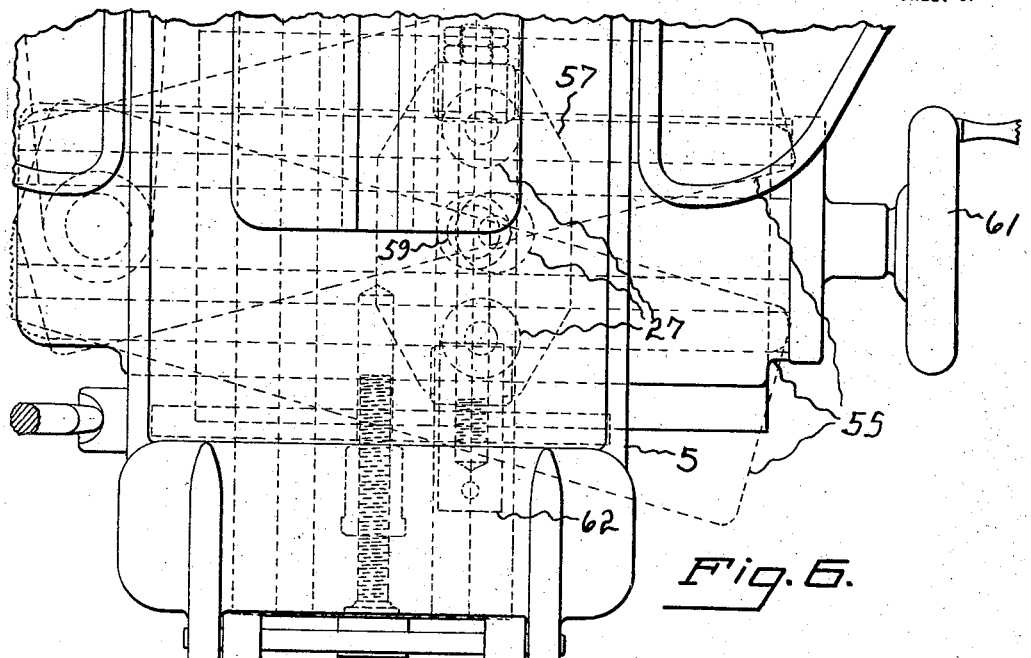
Fig. 6 is a top plan view of an intermediate portion of the machine.

I have alluded in a broad way to some of the features of the invention, it being clear that the invention comprises certain fundamental points. In the machine herein represented there is a plurality of spindles shown as coaxial and while these spindles may be utilized in any necessary way, I prefer that they carry suitable tools. They operate in conjunction with a carrier or table which is ordinarily reciprocatory but which need not necessarily be so as in some cases the table may have no motion. As a matter of fact there may be instances where none is provided, the work in this event being otherwise supported. These spindles are usually disposed at opposite sides of the carrier or table and I provide means by which I can obtain the independent adjustment for position of each spindle transversely to the direction of travel of the work carrier or table. In addition to this there are several other points, one being the independent adjustment of motion or table feed, another being identical intermittent feeds for both spindles, another being means for causing the spindles to recede either simultaneously or alternately upon the completion of the total feed, while still another is a means for entirely disconnecting the feed mechanism from one spindle in which event, the latter and the tool will be for the time being inactive. I provide also a means such as a friction feed device by which a very minute intermittent feed of one or both spindles may be obtained for special purposes or materials. The spindle feed device is so timed with the table-reciprocating mechanism as to cause the feed of the spindles to occur during the table stroke and not at the ends of the stroke or stationary points of reversal. I deem it proper to note that the feeding of the tool while the work is at rest has a detrimental effect on the cutting edge of the tool. I also provide means by which the spindle-feeding mechanism may be for instance manually operated not only independently of travel of the work carrier or table but can be accomplished in either direction of said spindle travel. These several points and others of equal importance will be set forth rather in detail following description.

The framework for sustaining the different parts of the machine may be of any convenient character; that shown being denoted in a general way by 2. As illustrated the framework is practically in the form of a base or bed which is generally practically cruciform in plan. I have already mentioned the fact that the machine comprises a carrier and at the same time have also observed that there may be instances where this carrier may not be used. While in an organized machine it is ordinarily reciprocatory there may be instances where it need not be in motion. Obviously this carrier or table may be used in various ways but I prefer that it be employed for sustaining work. A carrier or as it might be otherwise considered in the present case, work-table such as 5 answers my requirements. This work carrier or table 5 is shown in Figs. 1, 2, 3 and 4. It has reciprocation from one side of the machine to the other, when in motion. Said carrier or table 5 is gibbed to the upper portion of the base 2 (Fig. 3) and in the showing made is power-operable. To the upper side of the work carrier or table 5 the work to be operated upon, is suitably clamped or held.

There are two spindles as 6 and 7 (Figs. 1, 1ª, 2, and 12). Each of these spindles as I have already noted, carries in the showing made, a suitable tool which may be for illustration a fish-tail cutter, both denoted by 8, although as will be obvious an entirely different kind of tool may be carried by one or both of the spindles provided that in the organization there be a plurality of such spindles. I will describe hereinafter how the cutters 8 or their equivalents may be connected with the respective spindles. Each of said spindles 6 and 7 is supported by a barrel-like bearing such as that denoted in a general way by 9 (Fig. 1ª). These spindles are capable of approaching toward and receding from each other, partaking in this respect of the motion of their corresponding bearings 9. Each bearing 9 is rigid with a slide as 10, the base or bed 2 or as it might otherwise be considered the "top" of the frame, having suitable ways for receiving the two slides 10 (Figs. 1, 1ª, 3 and 3ª for instance). In addition to the main cross-slides 10, there are two supplemental cross-slides 10' associated as I will hereinafter explain, with the main or primary cross-slides 10 respectively. Each of these main or primary cross-slides 10, it will be understood, carries a barrel-like bearing 9 and the latter in turn a spindle. I will hereinafter describe a way by which the cross-slides 10 are operated. It will of course be understood that the disk heads of the two bearings 9 have openings to receive for rotation the terminal portions of the spindles. Each spindle (6 and 7) has around it and rotative therewith in this bearing, a barrel-like pinion as 12 (see Figs. 1ª, 2 and 15 for instance). In mesh with said barrel pinions 12 are gears as 13 (see for example Fig. 2). It will be clear, therefore, that when the gears 13 are rotated, the spindles 6 and 7 will be likewise rotated. In addition to this said spindles 6 and 7 are given a reciprocation. They are shown in Fig. 2 practically at the limits of their inward movement at which point it is assumed that they have almost completed the predetermined action. The rotation of the spindles it will be understood is that which is secured in the present case, to cause the tools to act in a certain manner on the work. This action is a cutting one as shown but it will be apparent that it may be of some other kind. In addition to the rotary movement of the spindles they have an endwise movement which is generally intermittent. Although as shown they are directly operated to secure their rotation, their endwise or feed movement is in fact indirectly obtained. The rotary movement of a spindle causes the tool to operate upon the work and the relative movement of the tool and the work transversely to the axis of rotation of the tool, for instance by the reciprocation of the work with the carrier or slide 5, results in the formation of an elongated groove or channel in the work while if two tools are cutting upon the work reciprocated in the manner set forth, there is formed in the work two opposite grooves. On the other hand if the tools cut completely through the work the latter will be longitudinally slotted through the combined movement of the work and the feed movement of the tools.

I have referred in a general way to the fact that the work carrier 5 is reciprocatory. I have also described how in part at least, the tool spindles may be rotated. I will now describe the mechanism shown for accomplishing the endwise movement of the tools or more properly of their spindles. Each of the slides 10 has rigidly connected with its outer side an outwardly extending rod 15 (Fig. 8) said rods having at their outer ends threaded heads 16 coöperative with nuts as 17 supported by the respective auxiliary slides 10' and immovable in the direction of their axes of rotation. In said Fig. 8 the threaded heads 16 have been partly moved toward the right in said view by the nuts which as will be clear are rotated for such purpose. On the advance of the threaded heads 16, the rods 15 and hence the slides 10 are correspondingly advanced so as to cause the two cutters 8 to cut into the work as I have already set forth. The two nuts 17 although rotary, have no individual movement of course in the direction of their axes of rotation. As a matter of fact the inner portions of the nuts are the only parts that are threaded, the remainder being plain or unthreaded. The nuts as shown have fastened thereto gears as 18 in mesh with barrel pinions as 19. It will, therefore, be clear that upon the rotation of said barrel pinions 19 the gears 18 and consequently the nuts 17 will be rotated to effect the advance or inward movement of the heads 16, rods 15 and cross slides 10 to cause the latter to approach each other. The rods 15 are shown as partly surrounded by the stationary tubes 20, rigid with the respective auxiliary slides 10' and receiving within their inner ends as shown, threaded plugs as 21 having central openings to freely receive the intermediate portions of the respective rods 15. Abutting against the forward ends of the threaded heads 16 are washers as 22 which are engaged by the inner ends of coiled springs as 23 surrounding the rods 15 and abutting at their opposite ends against the respective plugs 21. In the showing made each nut 17 and its threaded element such as the headed rod 15, is furnished with a multiple threaded portion, the same comprising three threads.

It should be explained that the auxiliary slides 10' (Fig. 1) have fastened thereto as by screws 20' the brackets or bearings 20'' which rigidly carry at their outer ends the respective tubes 20.

It is believed that it will be understood that the length of feed-movement of the spindles 6 and 7 through the corresponding movement of the rods 15, will be secured by the respective nuts 17, which respectively govern the amount of axial movement of the spindles. When the threaded heads 16 are in their backward positions their front or inner ends are spaced from the washers 22, the heads 16 not engaging said washers until the heads have practically left the nuts 17. This latter condition is shown in fact in Fig. 8. When the threaded heads 16, however, do engage said washers 22 they compress or further tension the springs 23 so that when said heads leave the nuts the springs under tension provide a means for holding the heads in position to engage the nuts.

The tubes 20 are provided interiorly thereof with annular shoulders 20' to limit the backward movement of the respective washers.

The threaded portions or screws 16 are as shown of compound formation, the threads thereof at their front ends as represented clearly in Fig. 9, being cut back on angles so that when the threads of the screws are free of their nuts 17, the springs 23 and fluid means to which I have referred, will urge the respective screws into axial abutment with their nuts, the latter in turn acting to give the screws an opposite motion. It follows therefore that when the screws are disengaged from the coöperating nuts at the conclusion of the cross feeds, the slides 10, owing of course to the rotation of the nuts, are given a vibration or reciprocation which is of comparatively small extent.

The base or bed 2, as I have already noted, supports on its upper side a carrier, table or slide as 5 which is reciprocatory on said base, the line of movement of the work carrier or table being transverse to the axes of rotation of the spindles 6 and 7 which as understood are shown as coaxial and which have a compound movement as I have already stated. When the work carrier or table 5 is reciprocated, this particular motion can be obtained in any suitable way, for instance by a cam as 24 (see for instance Figs. 5 and 15). As shown this cam is supported by a shaft 25 sustained by suitable bearings within the frame of the machine and driven in some proper manner, one way of securing which will be hereinafter set forth. Said cam or drum 24 has a peripheral groove 26 to receive the stud 27 consisting for instance of a roller connected with and depending from a part movable with the work carrier or slide 5, as shown for example by Fig. 5. The work carrier or slide 5 is shown in said view in its intermediate position. When grooving or slotting a piece of work on said work carrier or slide, the latter is given a complete reciprocation, generally several of them, until the predetermined effect is obtained. Therefore, the groove 26 is so shaped that the engagement of its walls with the stud or roller 27, imparts a complete reciprocation to the work carrier or slide on each full rotation of the cam or drum 24.

Each of the cross slides 10 is provided with a bearing as 28 which moves therewith the bearings receiving for rotation the hollow tubes 6' extending through the respective spindles 6 and 7. The bearings 28 are hollow and receive telescopic tubes as 29 (see Fig. 1ª for instance) and tubes 29 are shown parallel with the respective spindles and their inlet portions are connected with supply pipes as 30. The latter communicates with a suitable source of lubricant supply as the pump 67 hereinafter described. The lubricant, therefore, passes by way of the pipes 30 into the tubes 29 and bearings 28 from which the lubricant of whatever character it may be, is supplied to the rear ends of the tubes 6' in the spindles 6 and 7 respectively and is conducted by said tubes 6' to the cutting zone. This lubricant is not only intended to lubricate the cutters but actually cools the same it being clear that the spindles are of such nature as to effectively prevent escape of the cutting fluid or lubricant.

One section of each telescopic tube 29 moves with its respective cross slide 10, the other being fixed with respect thereto, the result being that an adequate supply of the lubricant under pressure is caused to flow through the tubes 6' to be disposed by them in the manner to which I have referred.

There is associated with each of the spindles (6 and 7) a chuck as 31 (see Figs. 1ª and 12) which grips the cutting tool. The chucks 31 fit the inner enlarged ends of the spindles 6 and 7, being externally tapered to fit correspondingly tapered portions in the inner enlarged ends of the respective spindles. Each chuck comprises several jaws 31' and receives within it the shank of its coöperating cutter. When, therefore, the chuck is moved backward in its spindle, its jaws 31' grip solidly and substantially the shank of the coöperating cutter. It will of course be understood that the heads and the shanks of the cutters 8 are channeled as at 8' to provide for the passage of the lubricant to the cutting zone in the manner to which I have already referred. Each tube 6' extends through the rear end of its spindle and has a shoulder 6" bearing against said rear end its forward end, having a threaded connection with the shank of its chuck 31, the result being that when a tube 6' is turned, for instance manually through the intervention of a wrench, in its spindle it is drawn back to impart a corresponding movement to its chuck 31 to thereby cause the contraction of the jaws 31' of the chuck about the shank of the tool held therein.

It will be clear that the feed of the tool spindles 6 and 7 can be accomplished in different ways. I prefer that they concurrently feed inwardly to form opposite channels in the work and also that the feed be such that the work can be slotted entirely through it. But means are provided such as that when the feed is concluded the action will be such as to prevent interference of the tools with each other as I will now explain. I should mention the fact that the gear 38 is loose on its shaft 32' and is adapted to be coupled thereto as by the plunger 71 carried at the free end of the crank 72 fixed to the shaft 32', Figs. 5 and 14 for instance, the plunger being adapted to be entered in one of the two holes 73 and 73ª in the face of said loose gear 38. It is shown as occupying the upper hole 73 in Fig. 5 in view of which circumstance the two tools will be caused to simultaneously approach at the close of their feed. If the plunger, however, be withdrawn from said hole 73 and seated in the hole 73' the two tools will be caused to approach in alternation at the conclusion of the feed.

The gear 38 being in fixed relation to the feeding mechanism of one spindle and the crank 72 with its plunger 71 being in fixed relation to the feeding mechanism of the other spindle, any modification of the relative position of the parts 71 and 38 changes the relative action of the two spindle feeds. In one of these adjustments both spindles feed forward at the same time. In the other case however, while their rates of forward movement are the same, one of the spindles will commence its forward movement before the other does.

I have referred to the fact that the carrier or table 5 is reciprocated through the action of the cam drum 24 which it will be recalled, acts upon the roller 27 associated with said carrier, the connection being such that the stud, roller or its equivalent can be adjusted transversely with respect to the carrier or equivalent appliance, thus to adjust the stroke or length of movement of the work carrier as I will hereinafter set forth. It will be clear that upon the rotation of the barrel pinions 19, the pinions 18 and consequently the nuts 17 will be rotated so as to cause the simultaneous advance or movement toward the right in Fig. 8 for instance, of the spindle bearing rod 15. It will of course be clear that on the advance of the spindles, the pressure of the liquid supplied for instance in the manner heretofore set forth, substantially holds the threads of the heads 16 against those of the nuts 17 so as to effectually prevent back lash. As the threaded heads are fed inward, they compress the springs 23 so that when said heads leave their nuts the springs positively maintain said heads in position to accurately reengage the nuts. While the inward or advancing movement of the rods 15 and hence of the two slides 10 through the intermediate described parts, is effected by power, the backward or retractive movement is obtained in the present case by hand as will hereinafter be described. As observed, owing to the presence of the springs 23 or their equivalent, together with the pressure of the liquid, the threaded heads 16 are, when disengaged from the coöperating nuts, forced backward for example by hand. The retraction of the cross slides 10 is at once obtained when the threads of the nuts are in position to engage those of the heads at which point such engagement set is accomplished and on the further movement of the heads 16 backward or outward movement of the two slides is accomplished.

The tool-carrying spindles 6 and 7 are as will be understood advanced by power. Below said spindles are shafts as 32 and 32' (Figs. 5 and 14 for example). One of said shafts as shaft 32 appearing in the foreground in Fig. 5 and on the right in Fig. 14, has fastened to it a disk as 33 which it should be noted is peripherally plain. The shaft 32 has also fixed to it a pinion 34 in mesh with the gear 35 the shaft of which is suitably carried by the framework 2. Said gear 35 in turn meshes with the gear 36 fastened to the shaft 37 to which is connected one of the barrel pinions 19 (Fig. 8) to which I have already referred. It will be clear that on the rotation of the shaft 32 the shaft 37 and hence the barrel pinion 19 will be rotated. This results in the rotation of the gear 18 and the consequent turning of the nut 17. The idler gear 35 in addition meshes with the gear 38 fastened to the shaft 32' complemental to the shaft 32. On the outer end of the shaft 32' is a gear 39 in mesh with the idler 40 on the framework of the machine and which in addition meshes with the gear 41 on the shaft 42 carrying the second of the two barrel pinions 19. This second barrel pinion 19 meshes with a gear 18 complemental to the gear on the outer side of the machine. It, therefore, follows that upon the rotation of the shaft 32 the shaft 32' will be likewise rotated so as to effect through the described structure, the concurrent rotation of the barrel pinions 19 and hence of the respective meshing gears 18 to turn the nuts 17 and thus move the heads 16 inward or toward each other to result in the approach of the spindles 6 and 7 in the manner hereinbefore set forth.

The framing of the machine pivotally supports the rocker as 43 (Fig. 5) adapted to be oscillated by the cam 44 fastened to the shaft 25, the operative portion of the rocker having a stud or anti-friction roller 45 to be directly engaged by the cam to swing or oscillate the rocker. There is rotative with the shaft of the rocker an arm 46 having as shown in its outer face the groove 47 which extends from the center of motion of the arm, this center being the same as that of the rocker 43. Said rocker 43 is held in constant engagement with the cam in some convenient way as by the spring-plunger 48 bearing against the upper branch of the rocker as illustrated in said Fig. 5. The groove 47 receives a stud 48 pivotally connected with the outer end of the rod 49, the stud being adjustable longitudinally of the groove 47. When the outer pivotal point of the rod or link is coincident with the center of motion of the rocker 43 it will be evident that upon the oscillation of said rocker no motion will be imparted to said rod or link 49. By moving the outer pivotal point of the rod or link away from the center of motion of the rocker, the reciprocatory movement of the rod or link will be caused on the oscillation of the rocker, the greater the amount of adjustment of the outer end of the link or rod from the center of motion of the rocker, the greater will be the stroke thereof. The arm 46 will have graduations upon its exposed surface to indicate the amount of stroke of the rod or link. The inner end of the rod or link 49 is pivoted to a rocker as 50 mounted loosely between its ends upon the shaft 32. This rocker is provided with a rigid extension or bowed arm 51 projecting practically from its center of motion the extension 51 having joined to it between the ends thereof, the toggle 52 to the inner branch of which is connected pivotally the dog or block 53 (Figs. 5 and 14). To this toggle near its center of motion is connected one end of the coiled spring 54 the other end of said spring being connected with the upper branch of the rocker 50. The spring therefore, tends to yieldingly hold the dog or block 53 in engagement with the plain peripheral portion of the disk 33. It will be clear, therefore, that upon the reciprocation of the rod or link 49 the dog or block 53 then in engagement with the periphery of the disk 33 will be given an oscillation, being adapted on each advance movement to impart a toggle feed movement to the disk 33 and being ineffective on the opposite movement. By swinging the dog or block 53 out of engagement with the periphery of the disk 33 the dog will be thrown into inactive relation and this particular result can be accomplished in a ready manner by swinging downward the outer, and upward the inner branch of the toggle lever 52. On the shaft 32 may be fixed a hand wheel 54'. It will, therefore, be clear that by disengaging the dog or block 53 from the disk 33 and by turning the hand wheel 54' the shafts 37 and 42 through the described connections can be operated to effect through the barrel pinions 19 and turning of the gears 18 for rotating the nuts 17 as may be desired to either minutely feed in or out through the described parts the coaxial spindles 6 and 7.

Figure 7:
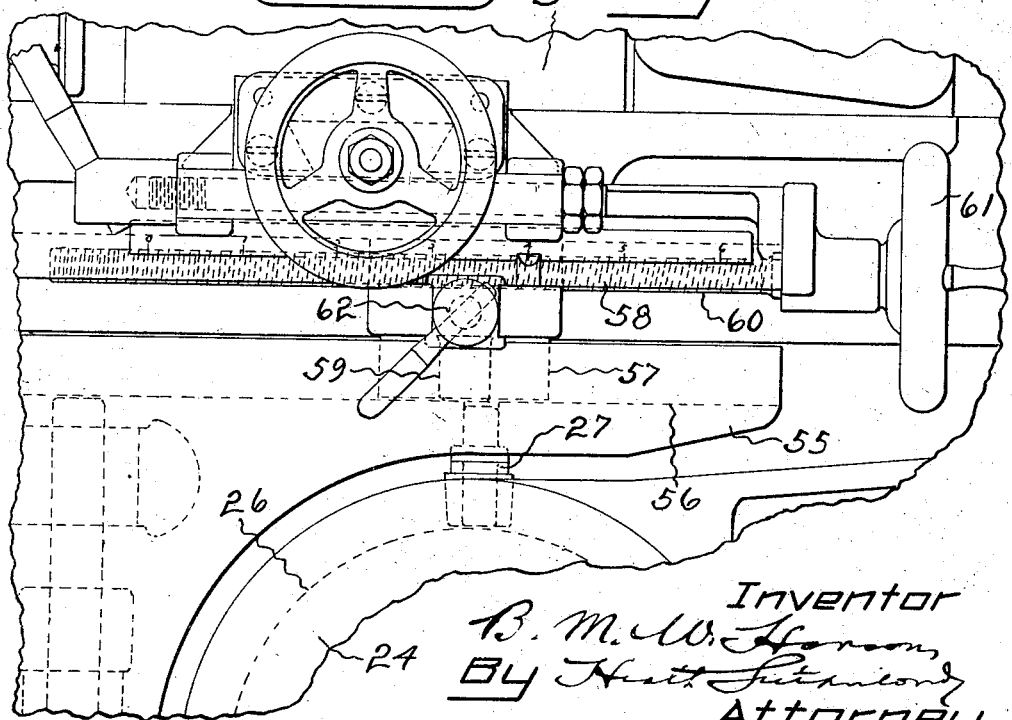
Fig. 7 is a front view of the showing made by Fig. 6.

I have mentioned the fact that the reciprocation of the carrier or slide 5 is accomplished through the agency of the cam roller or drum 24 which for such purpose operates against the stud or roller 27 as shown for example in Fig. 5. This stud or roller 27 while associated with the carrier or slide is not directly connected therewith in the present case, as I will now explain. In connection with this it is well to refer to Figs. 2, 6 and 7. Below the line of movement of said carrier 5, the framework 2 supports for oscillation or rocking movement the elbow lever 55, the upper or horizontal branch of which has a longitudinally extending groove or channel 56 in which is slidable the block 57, I should also note that said stud or roller 27 is connected with the upper branch of the elbow lever 55. The block 57 is surmounted by a slide 58 through which and the block extends the stud 59 interiorly threaded as shown to receive the threaded portion of the screw-shaft 60, rotatable by the hand wheel 61 and immovable in the direction of its axis of rotation. It is proper to note at this point that the slide 58 is guided in a channel in a member as 58' adjustably connected to the work-carrier, such adjustment of the member 58' being in the direction of motion of the work-carrier 5. The block 57 is adjustable as will be understood transversely of the line of movement of the carrier 5 and is held in its adjusted position by a clamp as 62. It will be assumed that it is desired to adjust the block 57. In this case the following operation will be adopted: Initially the clamp 62 will be loosened so as to permit the adjustment of the block 57 longitudinally of its groove or channel this adjustment being obviously accomplished through the rotation of the shaft 60 by the hand wheel 61. When the block 57 and slide 58 are in their transversely adjusted positions, whatever they may be, the clamp 62 is set to maintain the adjustment. When the center of the block 57 is intersected by the axis of oscillation of the elbow lever 55 it will be clear that the carrier or table 5 can be given no reciprocation. By adjusting the block away from the axis of oscillation of the elbow lever, the carrier or table 5 will be caused to reciprocate, the greater the adjustment of the block away from the center of motion of the elbow lever, the greater will be the stroke of the carrier or table 5.

I provide two spindles as will be clear, each carrying a tool and having a nut rotative therewith in conjunction with rotary screws for engaging the respective nuts in order to advance the respective spindles, and when the rotary screws are disengaged from the nuts, they cause reciprocation of the respective spindles so that the tools thereof can be utilized for slotting or cutting entirely through the work. The other feed which I have described accomplishes the grooving of the work on opposite surfaces.

Figure 15:
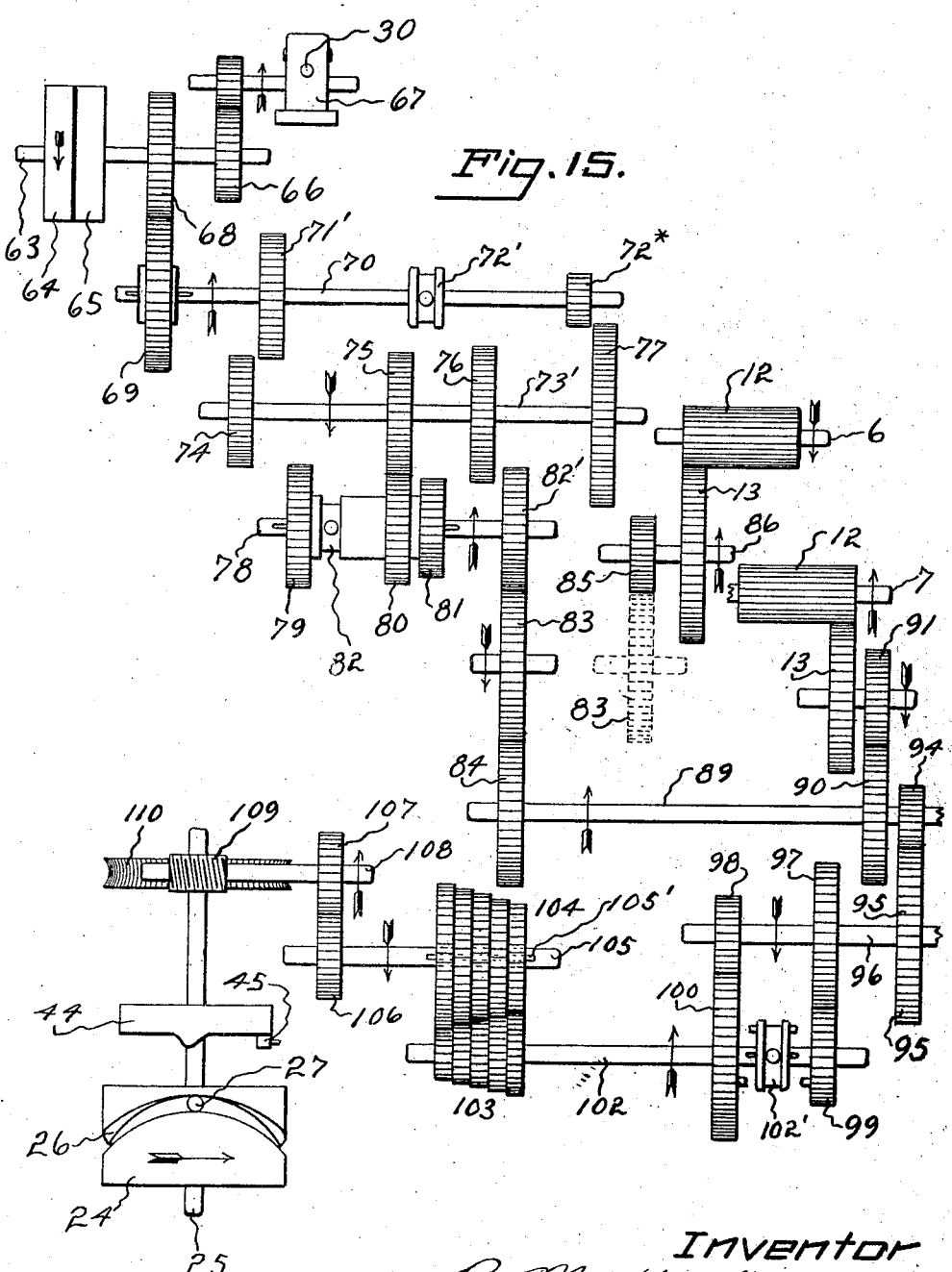
Fig. 15 is another diagram, hereinafter more particularly described.
Figure 18:
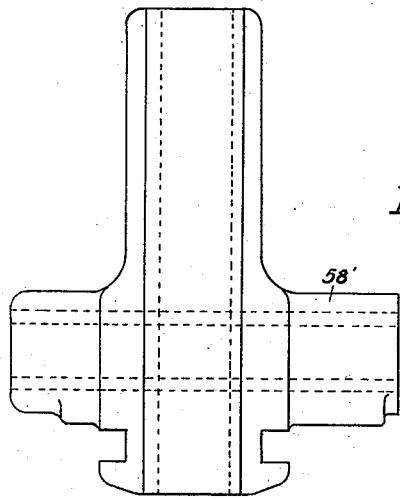
Fig. 18 is a top plan view of said cruciform member.
Figure 17:
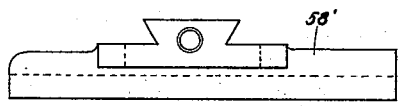
Fig. 17 is an elevation of the cruciform member as seen from the left of Fig. 16 with all parts omitted therefrom.
Figure 16:
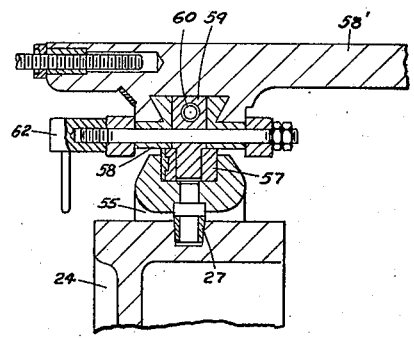
Fig. 16 is a cross sectional view of a cruciform member and parts below the same including a cam drum.

In Fig. 15 I have shown somewhat diagrammatically the main shaft of the machine which is denoted by 63 and it is provided with tight and loose pulleys 64 and 65. This main shaft also is geared as by the gearing 66 to the shaft of the pump 67 by which the lubricant is supplied under pressure in the manner previously set forth. On this main shaft 63 is a gear 68 in mesh with the gear 69 splined to the shaft 70, the two gears 68 and 69 being constantly in mesh. The shaft 70 has in addition to the gear 69, the large and small gears 71' and 72* tight thereon. This shaft 70 is capable of endwise movement under the action of the shifting device 72' but although it does move endwise it does not move the gear 69 out of mesh with the gear 68, this mesh as I have previously explained being a constant one. The shaft 73' has fixed to it the gears 74, 75, 76 and 77. The shaft 70 may be moved endwise so as to cause the gear 71' to mesh with the smaller gear 74 and in an opposite direction to move the small gear 72* into mesh with the large gear 77 to thus drive the shaft 73 at different speeds. The shaft 78 has splined to it the gears 79, 80 and 81 which are movable as a unit by the shifting device 82. The gear 80 is shown as being in mesh with the gear 75 but the unit composed of said three gears 79, 80 and 81 can be moved to carry the gear 80 out of mesh with the gear 75 or the gear 79 into mesh with the gear 74 or the gear 81 into mesh with the gear 76 to thus vary the speed of the shaft 78. There is tight on the shaft 78 the gear 82' in mesh with the idler gear 83 in mesh with the gear 84 and also with the gear 85 the shaft 86 of which fixedly carries the gear 13 in mesh with the barrel pinion 12 fixed to the spindle 6. The gear 84 is fastened to the shaft 89 provided with the gear 90 in mesh with the gear 91 fixed on its shaft and which carries fixedly the gear 13 in mesh with the barrel pinion 12 fixed to the spindle. The barrel pinions 12 are fastened to the tool spindles 6 and 7. By the mechanism described therefore, I can rotate these spindles at different speeds and correspondingly vary the rotation of the respective cutters 8. On the shaft 89 there is fixed the gear 94 in mesh with the larger gear 95 fixed to the shaft 96, this shaft also having fixed to it the small and large gears 97 and 98 coöperative with loose gears 99 and 100 adapted to be alternately clutched to their supporting shaft 102 as by the clutch member 102'. The shaft 102 has a bank of cone gears 103 meshing with the corresponding gears of the set 104, loose on the shaft 105 and any one of which is adapted to be coupled thereto as by the key 105. The shaft 105 has in addition the gear 106 fixed thereon and in mesh with the gear 107 to the shaft 108 having rigid with it the worm 109, meshing with the worm gear 110 fixed to the shaft 25. The shaft 25 it will be remembered carries the cam 24 by which the carrier, slide of table is reciprocated. At the same time the endwise movement of the spindles 6 and 7 is accomplished through the agency of the cam 44.

The action of the machine is as follows: It will be assumed that the work-table 5, spindles 6 and 7, and slides 10 and 10' are in their backward or retracted positions. They are shown as in their extreme advanced positions in Figs. 1, 1ª, 2, 2ª, 3 and 3ª. Initially the driving mechanism for the table 5 is adjusted to secure the desired stroke of said table after which the work is approximately located on said work-table when in its backward position so that the cut will commence at the proper point. The cutters 8 are then located in their chucks 9 and at the same time the adjustments of the spindles 6 and 7 and their slides 10 and 10' and feeding mechanism are made to determine the depth to be cut. The work-carrier or table 5 is then minutely adjusted so that the cut will be commenced at the right point. A single trial cycle at high speed is now made to determine the accuracy of the adjustments. Adjustments are then made to secure the proper speeds of the tool spindles 6 and 7 and feed of the work-table 5. The spindle-feeding mechanism is adjusted for the concurrent or alternate retraction of the spindles as may be required for opposite channels or through slots in the work. After this the action of the machine is entirely automatic. The slides 10' may be adjusted by the hand wheels 121 acting through the screws 120.

What I claim is:

1. A machine of the class described comprising a reciprocatory work-carriage, a pair of coaxial tool-carrying spindles at opposite sides of the work-carriage and rotative about axes transverse to the line of movement of the carriage, main slides carrying said spindles and movable transversely to said line of movement, and auxiliary slides to which the main slides are respectively connected for movement therewith, and means for adjusting the auxiliary slides transverse to said line of movement.

2. The combination of a reciprocatory work-table, a plurality of coaxial tool-carrying spindles at opposite sides of and transverse to the line of movement of the table, mechanism involving a nut and a screw, for advancing each spindle in the direction of its axis of rotation, the threads of the respective nuts and screws being formed to cause the spindles to reciprocate in opposite directions when the respective nuts and screws are out of feed connection and thus prevent interference of the tools.

3. The combination of a reciprocatory work-table, a plurality of tool-carrying spindles at opposite sides of and transverse to the line of movement of the table, each of the spindles having a nut rotative therewith, and rotary screws for engaging the nuts and adapted thereby to advance the respective spindles, the threads of the respective nuts and screws being formed to cause the spindles to reciprocate in opposite directions when the respective nuts and screws are out of feed connection and thus prevent interference of the tools.

4. In a machine of the class described, the combination of a reciprocatory work-carriage, a plurality of rotary tool-carrying spindles at opposite sides and transverse to the line of movement of the work-carriage, and mechanism for causing the feed of the spindles in the direction of their axes of rotation, each spindle feeding mechanism comprising a nut and a screw, the feed concluding when each nut is separated from its screw.

5. A machine of the class described comprising a reciprocatory work-carriage, a pair of tool carrying spindles at opposite sides of the work-carriage and rotative about axes transverse to the line of movement of the carriage, main slides carrying said spindles and movable transversely to said line of movement, auxiliary slides to which the main slides are respectively connected for movement therewith, and means for independently adjusting the auxiliary slides transverse to said line of movement.

6. A machine of the class described comprising a reciprocatory work-carriage, a plurality of coaxial tool-carrying spindles at opposite sides of the work-carriage and rotative about axes transverse to the line of movement of the carriage, and mechanism for causing the feed of the spindles in the direction of their axes of rotation, each spindle feeding mechanism comprising a nut and a screw, the feed concluding when each nut is separated from its screw.

7. In a machine of the class described the combination of a reciprocatory work-carriage, a plurality of rotary work-carrying spindles at opposite sides and transverse to the line of movement of the work-carriage, mechanism for causing the feed of the spindles in the direction of their axes, each spindle feeding mechanism comprising a nut and a screw the feed concluding when each nut is separated from its screw, and means for independently adjusting the feeds of the spindles.

8. A machine of the class described comprising a reciprocatory work-carriage, a pair of tool-carrying spindles at opposite sides of and rotative about axes transverse to the line of movement of the work-carriage, main slides carrying said spindles and movable transversely to said line of movement, auxiliary slides, means between the respective main and auxiliary slides for imparting a feed movement to the main slides, and means for adjusting the auxiliary slides, transverse to said line of movement.

9. A machine of the class described comprising a reciprocatory work-carriage, a pair of tool-carrying spindles at opposite sides of and rotative about axes transverse to the line of movement of the work-carriage, main slides carrying said spindles and movable transversely to said line of movement, auxiliary slides, nut and screw means between the respective main and auxiliary slides for imparting independent feed movements to the main slides and means for adjusting the auxiliary slides transversely to said line of movement.

10. In a machine of the class described, the combination of a reciprocatory work-table, a plurality of rotary tool-carrying spindles at opposite sides and transverse to the line of movement of the table, and mechanism involving a toggle and frictionally-operated part, for advancing the spindles in the direction of their axes of rotation.

11. In a machine of the class described, the combination of a reciprocatory work-table, a plurality of rotary and coaxial tool-carrying spindles at opposite sides and transverse to the line of movement of the table, and mechanism involving intermittently and frictionally-operable means, for advancing the spindles in the direction of their axes of rotation.

12. In a machine of the class described, the combination of a reciprocatory work-table, a plurality of rotary and coaxial tool-carrying spindles at opposite sides and transverse to the line of movement of the table, intermittently and frictionally-operative means, and means for transferring the effect of said intermittently and frictionally operative means to the respective spindles in a direction to cause them to move toward the work-table.

13. In a machine of the class described, the combination of a reciprocatory work-table, a plurality of rotary tool-carrying spindles at opposite sides and transverse to the line of movement of the table, a wheel, a toggle operated element for rotating said wheel, and means for transferring the effect of said wheel to said spindles for feeding the same toward the work-table.

14. A machine of the class described comprising a reciprocatory work-carriage, a pair of coaxial tool-carrying spindles at opposite sides of the work-carriage and rotative about axes transverse to the line of movement of the carriage, main slides carrying said spindles and movable transversely to said line of movement, auxiliary slides, means for adjusting the auxiliary slides transverse to said line of movement, rotary nuts carried by the respective auxiliary slides, and screws engaging the respective nuts and connected with the respective auxiliary slides.

15. A machine of the class described comprising a reciprocatory work-carriage, a pair of coaxial tool-carrying spindles at opposite sides of the work-carriage and rotative about axes transverse to the line of movement of the carriage, main slides carrying said spindles and movable transversely to said line of movement, auxiliary slides, rotary nuts carried by the respective auxiliary slides, screws engaged by the respective nuts and connected with the respective auxiliary slides, and means for independently adjusting the auxiliary slides transverse to said line of movement.

16. In a machine of the class described, the combination of a reciprocatory work-table, a plurality of rotary tool-carrying spindles at opposite sides and transverse to the line of movement of the table, and mechanism for causing the feed of the spindles in the direction of their axes of rotation each spindle feeding mechanism comprising a nut and a screw, the feed concluding when each nut is separated from its screw, and means for holding each nut and screw in axial abutment after they are disengaged on the conclusion of the spindle feeds.

17. In a machine of the class described, the combination of a reciprocatory work-table, a plurality of rotary tool-carrying spindles at opposite sides and transverse to the line of movement of the table, mechanism for causing the feed of the spindles toward the table in the direction of their axes of rotation, each feeding mechanism comprising a nut and a screw and the feeds concluding when the respective nuts and screws are separated, and spring and hydraulic means for maintaining the respective nut and screws in axial abutment.

18. In a machine of the class described, the combination of a reciprocatory work-table, a plurality of rotary tool-carrying spindles at opposite sides and transverse to the line of movement of the table each spindle being hollow and the tools carried thereby being respectively channeled, means for directing a cooling fluid along the spindles and through the channels of the tools, and nut and screw means for rotating and for advancing the respective spindles, the cooling fluid acting to hold the respective nuts and screws in operative contact.

19. In a machine of the class described, the combination of a reciprocatory work-table, means for adjusting the stroke of said work-table, a plurality of rotary tool-carrying spindles at opposite sides of and transverse to the direction of movement of the table, a plurality of slides, means for adjusting said slides toward and from the line of movement of the table, and nut and screw means for feeding said spindles toward the table.

20. In a machine of the class described, the combination of a reciprocatory table, means for adjusting the stroke of the table, slides at opposite sides of the table, means for adjusting the slides toward and from the table, spindles on the respective slides rotative about axes transverse to the line of movement of the table, and nut and screw means for intermittently feeding said spindles toward the table.

21. In a machine of the class described, the combination of a reciprocatory work-carrying table, means for adjusting the length of stroke of the table, a pair of main slides at opposite sides of and transverse to the line of movement of the table, auxiliary slides connected with the respective main slides, means for adjusting said auxiliary slides toward and from said line of movement, coaxial, rotary tool-carrying spindles supported by the respective main slides and the axes of which are transverse to said line of movement, and means for intermittently feeding said spindles toward the table and independently of the adjustment of said slides.

22. In a machine of the class described, the combination of a reciprocatory work-carrying table, means for adjusting the length of stroke of the table, a pair of slides at opposite sides of and transverse to the line of movement of the table, means for adjusting the slides in their lines of movement, coaxial, rotary tool-carrying spindles the axes of which are transverse to said line of movement of the table and supported by the respective slides, and means for frictionally and intermittently feeding said spindles toward the table.

23. In a machine of the class described, the combination of a reciprocatory table, a slide adjustable toward and from the line of movement of the table, a spindle on said slide, and means for frictionally intermittently feeding the spindle on the slide toward the line of motion of the table.

24. In a machine of the class described, the combination of a reciprocatory work-carrying table, means for adjusting the stroke of said table, a slide adjustable toward and from the line of motion of the table, a tool-carrying spindle supported by said slide and rotative about an axis transverse to the line of motion of the table, and means for frictionally intermittently feeding the spindle toward the said line of motion.

25. In a machine of the class described, the combination of a reciprocatory work-carrying table, means for adjusting the stroke of said table, a pair of slides at opposite sides of the table and adjustable toward and from the line of motion thereof, a pair of coaxial, rotary tool-carrying spindles supported by the respective slides and the axes of rotation of which are transverse to said line of motion, and means for frictionally intermittently advancing said spindles toward the table, independently of the adjustment of the respective slides.

26. In a machine of the class described, the combination of a work-carrying table, means involving a cam, for reciprocating said table, a pair of slides at opposite sides of and adjustable toward and from the line of movement of the table, coaxial, rotary tool-carrying spindles transverse to the line of movement of the table supported by the respective slides, means involving a cam for feeding said spindles in the direction of their axes of rotation, and means for adjusting the slides toward and from the table.

27. In a machine of the class described, the combination of a work-carrying table, means involving a cam, for reciprocating said table, a pair of slides at opposite sides of and adjustable toward and from the line of movement of the table, coaxial, rotary tool-carrying spindles transverse to the line of movement of the table and supported by the respective slides, a rotary cam, and means operated by said rotary cam, for imparting an intermittent feed movement to the two spindles in the direction of their axes and toward the table.

28. In a machine of the class described, the combination of a reciprocatory work-table, a pair of slides mounted for movement toward and from the line of movement of the work-table, tool-carrying spindles supported by the respective slides and rotative about axes transverse to said line of movement, and frictionally-operative means for imparting an intermittent movement to the slides to effect the movement of the spindles supported thereby toward the table.

29. In a machine of the class described, the combination of a reciprocatory work-table, a pair of slides mounted for movement toward and from the line of movement of the work-table, coaxial tool-carrying spindles supported by the respective slides and rotative about axes transverse to said line of movement, and frictionally-operative means for imparting an intermittent movement to the slides to effect the movement of the spindles supported thereby toward the table.

30. In a machine of the class described, the combination of a reciprocatory work-table, a pair of primary slides mounted for movement toward and from the line of movement of the work-table, tool-carrying spindles supported by the respective slides and rotative about axes transverse to said line of movement, a pair of secondary slides coöperative with the respective primary slides, a nut rotatively supported by each secondary slide, a screw coöperative with each nut, the screws being connected with the respective primary slides, and means for rotating the respective nuts.

31. In a machine of the class described, the combination of a reciprocatory work-table, a pair of primary slides mounted for movement toward and from the line of movement of the work-table, tool-carrying spindles supported by the respective slides and rotative about axes transverse to said line of movement, a pair of secondary slides coöperative with and movable in the same direction as the primary slides, and means supported by the secondary slides for effecting a feed movement of the spindles toward the work-table.

32. In a machine of the class described, the combination of a reciprocatory table, a pair of primary slides mounted for movement toward and from the line of movement of said table, spindles supported by the respective slides and rotative about axes transverse to said line of movement, a pair of secondary slides coöperative with and movable in the same direction as the primary slides, and means supported by the secondary slides, for effecting a feed movement of the spindles toward the table.

33. In a machine of the class described, the combination of a reciprocatory table, a pair of primary slides mounted for movement toward and from the line of movement of said table, spindles supported by the respective slides and rotative about axes transverse to said line of movement, a pair of secondary slides coöperative with and movable in the same direction as the primary slides, and frictionally-operative nut and screw means for effecting the feed movement of the spindles toward the table.

In testimony whereof I affix my signature in the presence of two witnesses.

BENGT M. W. HANSON.

Witnesses:
HEATH SUTHERLAND,
JOHN S. FITZSIMMONS.